US00RE39375E

(19) United States
(12) Reissued Patent
Hamalainen et al.

(10) Patent Number: US RE39,375 E
(45) Date of Reissued Patent: Nov. 7, 2006

(54) SYSTEM FOR TRANSMITTING PACKET DATA IN DIGITAL CELLULAR TIME DIVISION MULTIPLE ACCESS (TDMA) AIR INTERFACE

(75) Inventors: Jari Hamalainen, Tampere (FI); Zhi Chun Honkasalo, Vantaa (FI); Harri Jokinen, Hiisi (FI)

(73) Assignee: Nokia Mobile Phones Ltd, Espoo (FI)

(21) Appl. No.: 09/255,325

(22) Filed: Feb. 23, 1999

Related U.S. Patent Documents

Reissue of:
(64) Patent No.: 5,640,395
Issued: Jun. 17, 1997
Appl. No.: 08/431,559
Filed: May 1, 1995

(30) Foreign Application Priority Data

May 3, 1994 (FI) ..... 942038

(51) Int. Cl.
*H04B 7/212* (2006.01)

(52) U.S. Cl. ..... 370/322; 370/337

(58) Field of Classification Search ..... 370/310, 370/321, 322, 337, 442, 443, 449, 345, 346, 370/347, 348, 349; 340/825.07, 825.08, 825.54; 455/32.1, 509, 510, 512, 514, 515
See application file for complete search history.

(56) References Cited

U.S. PATENT DOCUMENTS 4,763,319 A * 8/1988 Rozenblit ..... 370/397
4,837,800 A * 6/1989 Freeburg et al. ..... 455/557
4,887,265 A * 12/1989 Felix ..... 370/333

(Continued)

FOREIGN PATENT DOCUMENTS

EP 0048854 A1 * 4/1982
EP 0048861 A1 * 4/1982

(Continued)

OTHER PUBLICATIONS

D. Bertsekas, R. Gallager, Data Networks, Prentice–Hall Inc., 1987 New Jersey, Chapters 2.7 and 2.8.3, pp. 91, 92, 99, 100, 101.*

(Continued)

*Primary Examiner*—Andrew Lee
(74) *Attorney, Agent, or Firm*—Perman & Green, LLP

(57) ABSTRACT

The invention relates to a system for transmitting packet data in the air interface of a digital cellular system based on TDMA, Time Division Multiple Access. The mobile terminated logical channels comprise information channels designated for transmitting information and control channels, which can be a fast paging (FP) channel and an acknowledgement (A) channel. The mobile originated logical channels comprise information channels designated for transmitting information and a reservation (R) channel, whereon the mobile station requests the system to reserve a connection for transmitting packet data. According to the invention, for the TDMA frames there is allocated a variable number of time slots for packet transmission, taking into account the symmetricity/asymmetricity of the packet transmission, as well as the total packet transmission demand of the cell. For fast paging (FP), acknowledgement (A) and reservation (R), there can be employed any of the time slots in the frame allocated for packet transmission. It is advantageous that in each time slot, the subscriber's data is subjected to the same interleaving and forward error coding algorithm, so that the respective time slots of consecutive frames form independent logical sub-channels, which are then reserved for one subscriber according to the needs, and to which the subscriber's data is multiplexed at the beginning of the transmission, and wherefrom it is again demultiplexed after the transmission.

74 Claims, 6 Drawing Sheets

U.S. PATENT DOCUMENTS

| | | | | | |
|---|---|---|---|---|---|
| 4,972,506 | A | * | 11/1990 | Uddenfeldt | 370/337 |
| 5,008,883 | A | * | 4/1991 | Eizenhofer et al. | 370/348 |
| 5,081,704 | A | * | 1/1992 | Umeda et al. | 455/450 |
| 5,103,445 | A | * | 4/1992 | Ostlund | 370/329 |
| 5,109,527 | A | * | 4/1992 | Akerberg | 455/437 |
| 5,117,423 | A | * | 5/1992 | Shepherd et al. | 370/321 |
| 5,142,533 | A | * | 8/1992 | Crisler et al. | 370/349 |
| 5,159,702 | A | * | 10/1992 | Aratake | 455/464 |
| 5,166,929 | A | * | 11/1992 | Lo | 370/448 |
| 5,199,031 | A | * | 3/1993 | Dahlin | 370/329 |
| 5,239,678 | A | * | 8/1993 | Grube et al. | 455/511 |
| 5,276,680 | A | * | 1/1994 | Messenger | 370/311 |
| 5,404,355 | A | * | 4/1995 | Raith | 370/311 |
| 5,404,392 | A | * | 4/1995 | Miller et al. | 455/466 |
| 5,420,864 | A | * | 5/1995 | Dahlin et al. | 370/347 |
| 5,430,724 | A | * | 7/1995 | Fall et al. | 370/337 |
| 5,434,847 | A | * | 7/1995 | Kou | 370/252 |

FOREIGN PATENT DOCUMENTS

| | | | | |
|---|---|---|---|---|
| EP | 0369535 | A3 | * | 5/1990 |
| EP | 0399611 | A3 | * | 11/1990 |
| EP | 0399612 | A2 | * | 11/1990 |
| EP | 0587980 | A2 | * | 3/1994 |
| GB | 2270815 | | * | 3/1994 |

OTHER PUBLICATIONS

IEEE Transactions On Vehicular Technology, "Voice and Data Integration in the Air–Interface of a Microcellular Mobile Communication System", vol. 42, No. 1, Feb. 1993.*

Mouly, et al., "The GSM System for Mobile Communications", 1992, France, pp. 215–216, 231–241, 346–349.*

"European digital cellular telecommunications system (Phase 2); Mobile radio interface layer 3 specification (GSM) 04.08)", ESTI, May 1995, pp. 37–40, 183–186.*

"European digital cellular telecommunications system (Phase 2); Physical layer on the radio path General description (GSM 05.01)" ETSI, May 1995, pp. 1–19.*

"European digital cellular telecommunications system (Phase 2); Channel coding (GSM 05.03)", ESTI, Aug. 1995, pp. 1–5 and Mar. 1995, pp. 1–31.*

Electronics and Communication Journal, vol. 5, No. 3, Jun. 1, 1993, pp. 180–186, Dunlop, J., "A Reservation Based Access Mechanism For 3rd Generation Cellular Systems".*

IEEE Transactions On Vehicular Technology, vol. 39, No. 4, Nov. 1, 1990, pp. 340–351, Mitrou et al. "A Reservation Multiple Access Protocol For Microcellular Mobile–Communicatin Systems".*

Finnish Official Action and English Translation thereof, dated Mar. 6, 1995, Application No. 942038.*

Hodges, M.R.L., "The GSM radio interface", British Telecom Technology Journal vol. 8 No. 1, Jan. 1990, pp. 31–43.*

* cited by examiner

FIG. 1.
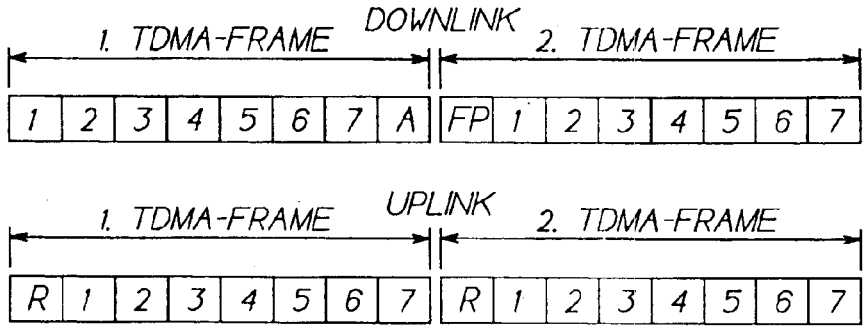
FIG. 4A
FIELDS OF FP/A BURST
| TEMPORARY IDENTIFICATION OF MS | RANDOM NUMBER | TA |
|---|---|---|
FIG. 4B
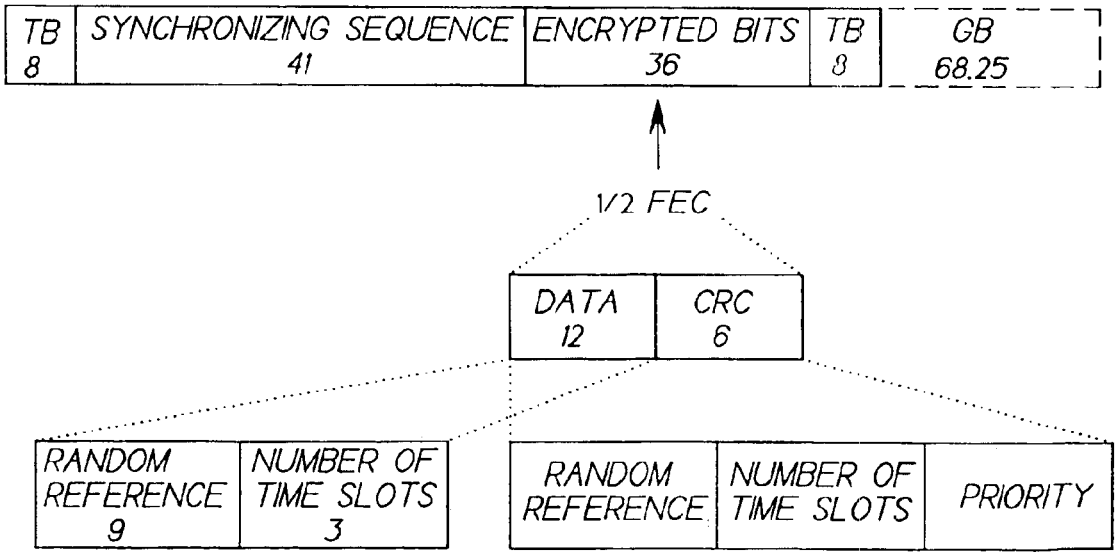

FIG. 8
FIELDS OF ACKNOWLEDGEMENT BURST
| RANDOM NUMBER + NUMBER OF TIME SLOTS | ALLOCATED TIME SLOTS | TA | ACKNOWLEDEMENT BIT MAP |
|---|---|---|---|
FIG. 9
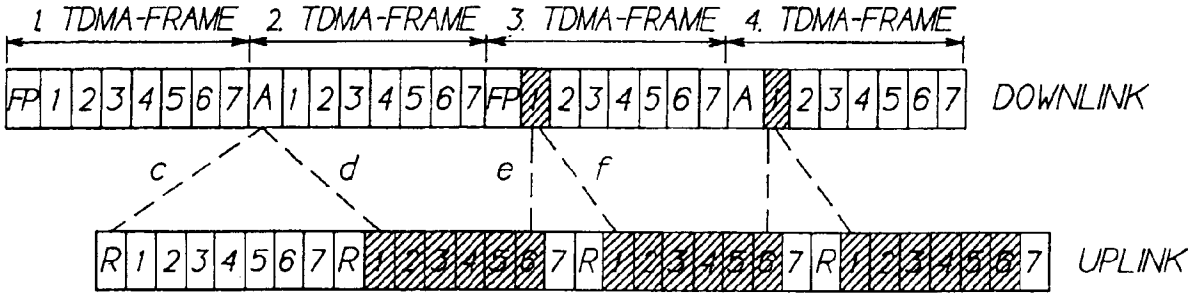
FIG. 10
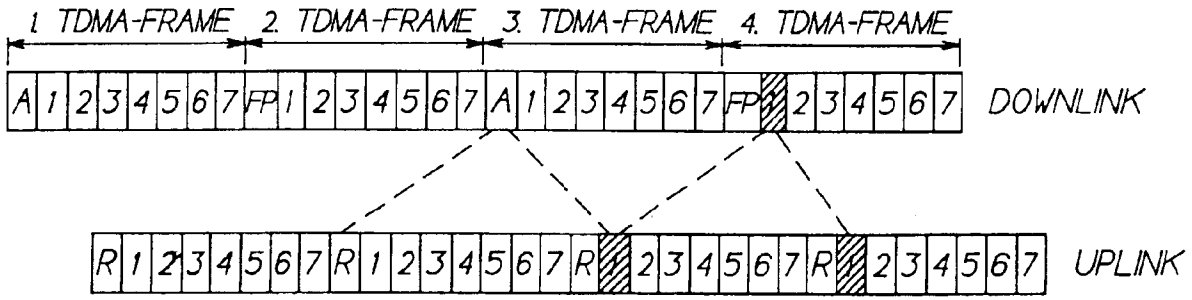

SYSTEM FOR TRANSMITTING PACKET DATA IN DIGITAL CELLULAR TIME DIVISION MULTIPLE ACCESS (TDMA) AIR INTERFACE

Matter enclosed in heavy brackets [ ] appears in the original patent but forms no part of this reissue specification; matter printed in italics indicates the additions made by reissue.

BACKGROUND OF THE INVENTION

The present invention relates to the transmission of packet information in the air interface of a packet radio system. The general range of application is any digital cellular system based on TDMA, Time Division Multiple Access.

The majority of current cellular networks provide effective data and speech services based on circuit switched technology. However, the utilization or transmission resources in circuit switching is unoptimal, because the transmission connection is maintained throughout the contact irrespective of the fact whether information is transmitted or not at a given moment. Transmission resources are shared by multiple users, which means that the reservation of circuit switched connection for one subscriber only unnecessarily uses by transmission resources from other subscribers. The burstiness of data services also is a drawback in circuit switched systems. The utilization of the channel can actually be enhanced by applying packet switched information transmission. On the other hand, packet switching should be used only when an actual need arises, because the burstiness of data services is high and this may cause interference in circuit switching.

The future third generation cellular system UMTS (Universal Mobile Telecommunications System) must be able to transmit both circuit switched and packet data transmission, such as ISDN (Integrated Services Digital Network) and ATM (Asynchronous Transfer Mode) transmission. Now the key factor is the air interface, where an advanced multiple access technology is employed; by means of this, the channels supporting different types of services must be effectively multiplexed in the air interface both to and from the radio channel. The conference publication "Mobile and Personal Communications, 13–15 December 1993, Conference Publication No. 387, IEE 1993" includes the article "A Reservation Based Multiple Access Scheme for a Future Universal Mobile Telecommunications System" by J. M. DeVille, which describes the requirements to be set for the air interface of a UMTS system. For example, multiple access must be able to utilize the Inactivity of the Information source by granting a physical channel only when there is activity on the logical channel, and to support different bit rates so that time slots in the frame are allocated to the logical channel according to the needs of the situation.

In order to satisfy these and other requirements, there is suggested the multiple access control method PRMA++ (Packet Reservation Multiple Access), which is part of a design for third generation cellular systems related to the transmission of packetized speech and data. PRMA++ can thus be used as multiple access control bath In packet switched and circuit switched transmission. The PRMA++ method concentrates on using one time slot in the transmission of packet data.

On the radio channel, PRMA++ uses Time Division Multiple Access TDMA. This allows the subscriber to share the transmission resources of the radio channel. The TDMA frame is divided into time slots, where the transmitted burst carries the data as well as signals connected to channel coding, notifications etc. In the uplink direction, which is the direction from the mobile station to the network (base station:), there are two types of time slots: reservation or R-slots, where only channel request bursts are transmitted, and information transmission or I-slots, which are only used for transmitting information bursts. In the channel request burst, the mobile station uses an Air-Interface Channel Identifier containing the network address of the mobile station, which address identifies the logical channel, and where it requests one or more time slots from the frame, according to the needs of the moment. In the downlink direction, i.e. from the network (base station) to the mobile station, there are likewise two types of time slots: I-slots reserved from transmitting information, and acknowledgement or A-slots. When the mobile station requests access to the network, the base station acknowledges the request on A-slots by transmitting the address of the subscriber and the number of the I-slot. From this onward, the said I-slot is reserved for the use of the mobile station.

Let us suppose that the number N of the PRMA++ time slots in one TDMA frame is a system configuration parameter. On the uplink channel, one TDMA frame now contains one R-slot and N-1 numbers of I-slots. All mobile stations start transmission by transmitting a channel request on the R-slot, and if several mobile stations use the same R-slot for transmitting the request, collisions may occur. The downlink TDMA frame includes, in addition to the above mentioned A-slot for acknowledging channel requests transmitted on the R-slot and I-slots, also a fast FP (Fast Paging) slot constituting the fast paging channel, on which the mobile station is notified of incoming data transmission and of information transmission slots.

The mobile station starts transmission by channel request on the uplink channel on an R-slot, which is used for this purpose by all mobile stations of the same cell. The base station acknowledges the received channel request on the acknowledgement burst on the downlink A-slot. If no requests are transmitted on the R-slot, or if on the channel there are collisions, identified by the base station, the base station transmits an idle flag on the acknowledgement burst of the respective A-slot, so that the mobile station understands to repeat the channel request after some time. In case The channel request sent on the R-slot was correctly received, but there are no free time slots for the transmission, the mobile station is notified of this on the next downlink time slot. The mobile station queues for access until a free time slot is found.

The R-slot contains a training sequence, address of the mobile station, number of requested information slots and a circuit switched flag. The flag informs whether the reservation is valid for the duration of the packet or longer. The channel is reserved, until an order for cancelling the reservation arrives. The A-slot acknowledgement burst contains the address of the requesting mobile station as well as the channels that are granted for traffic. The mobile station receives the acknowledgement burst, whereafter it tunes the receiver and transmitter to the allocated channel. Traffic on this channel is started, and it continues as long as there is data or speech to be transmitted. In packet data transmission, the number of bursts—bursts here meaning packets that are transmitted after one channel request—can be constant.

The base station uses the fast paging slot, FP-slot, to notify the mobile station of an incoming packet. The mobile station listens to the FP-channel and decodes all received messages in order to notice its own identifier. The time slot on the fast paging channel contains a list of those I-slots that are allocated for the mobile station. The mobile station acknowledges its own paging by transmitting an acknowledgement in the FP-acknowledgement slot.

According to what was said above, it is characteristic of the suggested UMTS system both in the uplink and in the downlink directions that physical channels are not allocated for connections which are not active at a given moment, and hence they do not reserve capacity in vain. The channels are always reserved by the same protocol, both in the case of circuit switched and packet transmission. The allocation of the channels is not dynamic, wherefore the channels reserved for packet usage cannot easily be altered. Reservation, fast paging and acknowledgement slots are given slots, and the state of the art does not comment on altering these. Moreover, the known method does not pay particular attention to the symmetricity or asymmetricity of packet transmission when creating a transmission channel.

SUMMARY OF THE INVENTION

The present invention relates to a packet data transmission system in an air interface, the said system having eliminated the above described drawbacks. In accordance with the invention, there is created a flexible system whereby channels can be flexibly created and altered according to the situation in hand, which enables an extremely effective utilization of the channel resources and provides possibilities for using different data rates. Here the system is called Variable Rate Reservation Access VRRA.

Aspects of the invention are defined in the appended claims.

Channels are allocated dynamically so that a variable number of time slots in the cell is reserved for packet usage, and the rest of the time slots are used for circuit switched services, including speech, The mobile station can select the number of employed time slots, and the network adjusts to that, so that even a simple one-slot mobile station can use the packet services. In case several time slots are reserved for the mobile station, each of which slots constitutes a sub-channel, for each slot there is designed error correction, interleaving and a corresponding frame length. If several time slots are required for one mobile station, there are reserved several of the said sub-channels, and each sub-channel uses the same error correction and interleaving algorithm. Thus there is needed only one algorithm. In the information transmission of the subscriber, the MAC layer at the transmitting end distributes the subscriber data to be carried through several sub-channels, and the MAC layer at the receiving end receives the frames of the sub-channels and compiles them to a complete subscriber data. From the point of view of the base station, each time slot is thus similar on the physical level. Now one and the same mobile station can use for instance two time slots, or one mobile station can use one and another can use the other. The prior art applies algorithms for units of one, two, three etc. time slots, in which case the base station respectively deals with channels comprised of one, two, three etc. time slots. A data stream conducted to the radio channel through the radio interface is multiplexed into several "pipes", i.e. into said independent sub-channels, and after receiving the packets, the data is again demultiplexed from the "pipes" to a data stream.

BRIEF DESCRIPTION OF THE DRAWINGS

As exemplary embodiment of the invention is further described with reference to the appended drawings, where:

FIG. 1 depicts the frame structure of a prior art system;

FIG. 4A depicts a fast paging/acknowledgement burst;

FIG. 4B depicts a modified access burst;

FIG. 8 depicts the fields of the acknowledgement burst;

FIG. 9 depicts an alternative to asymmetric transmission;

FIG. 10 depicts a symmetric packet transmission;

DESCRIPTION OF THE PREFERRED EMBODIMENT

In the examples below, it is assumed that the frame structure in the network is such that one TDMA frame consists of eight time slots, in the same fashion as in the known GSM system, but it is understood that the number of time slots is a system configuration of free choice. The number of those time slots that are allocated for packet radio can depend on the use demand for packet data in the cell. If there are only a few packet service subscribers, it is sufficient to allocate just a few time slots in the frame for packet data, and if there are several subscribers, all eight time slots are reserved. It is up to the operator to configure how many time slots must be reserved.

Figure 2:
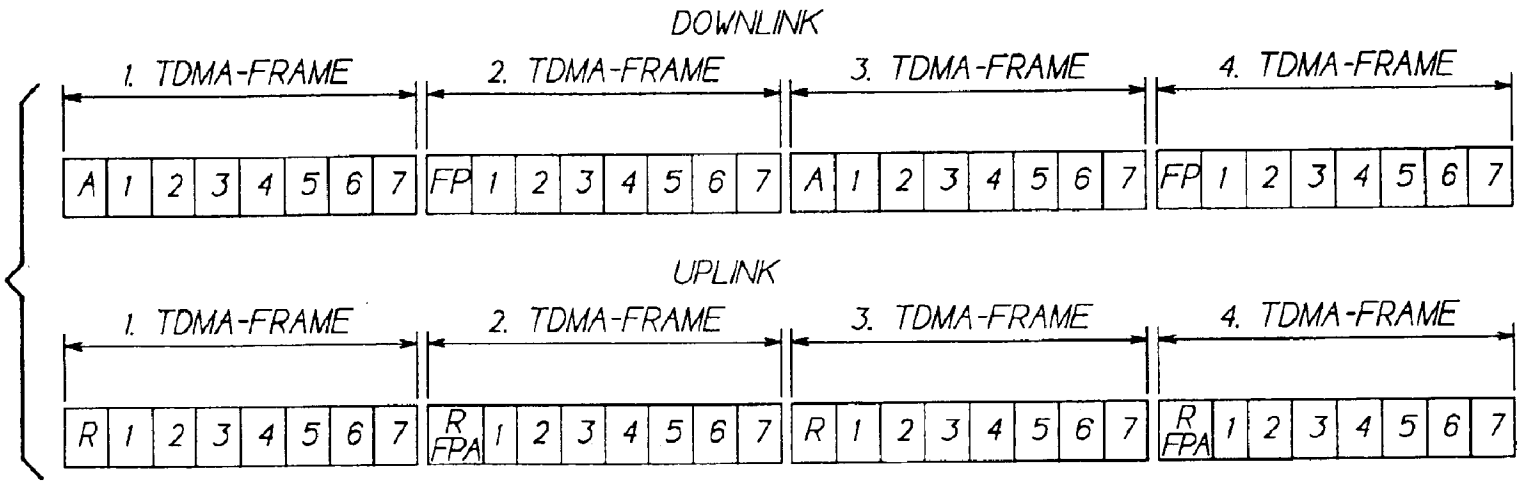
FIG. 2 is an example of using all time slots of the TDMA frame.

FIG. 2 illustrates an extreme case where all eight time slots in the frame are reserved for transmitting information data. In a logical channel arrangement in the downlink, the fast paging FP-slots and the acknowledgement A-slots for the requests transmitted by the mobile stations logically share the control time slot, which is the first slot in each frame. In the uplink, the random access slot R is repeated at standard frequency. Every second R-slot can be replaced by a fast paging acknowledgement slot, FPA-slot. This can be used for acknowledging reception of fast paging, in case other acknowledgements are not in use. In this example the control channels both on the downlink and uplink channels are thus formed of every eighth time slot. The rest of the time slots, enumerated from 1 to 7, are used for transmitting packet data. In this extreme case, the data transmission rate is maximal, because the whole frame is in use, i.e. transmission takes place on every time slot.

Figure 3A:
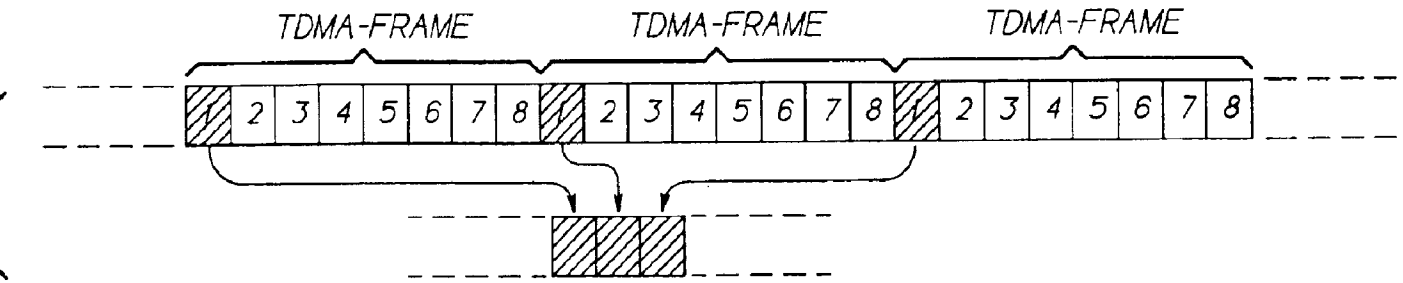
FIG. 3A depicts the principle when all time slots are not used.
Figure 3B:
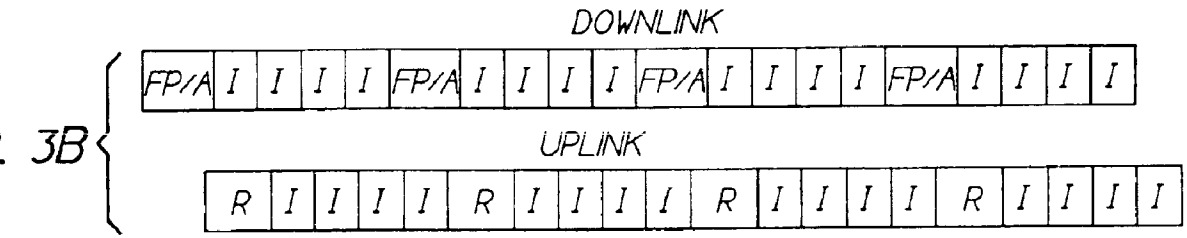
FIG. 3B is an example of using one single time slot of the TDMA frame.

FIGS. 3A and 3B illustrate an extreme case where only one time slot in the frame is reserved for transmitting packet data. Now the seven remaining time slots are free to be used for instance for circuit switched purposes. FIG. 3A shows in principle how the logical channel is formed. According to the drawing, the first time slot in each frame is reserved for transmitting packet data, and the slots 2 . . . 8 are free for other use. The time slots reserved for transmitting packet data are illustrated as darkened squares. The consecutive first time slots of each frame thus form a channel, their "frame" consisting of one time slot. FIG. 3A illustrates the logical channel created at the tip of the arrows. In this extreme case, the transmission bursts take place on every eighth time slot with respect to the TDMA frame, wherefore the data transmission rate is low.

FIG. 3B depicts some uplink and downlink channels formed according to the principle illustrated in FIG. 3A. They contain FP- of FP/A-slots and R-slots, as well as I-slots for information data. In the uplink direction, the R-slots may have permanent locations, in the drawing every fifth slot, which means that an R-burst can be transmitted on every fifth TDMA frame of the network, on the first time slot thereof. In the downlink, these permanent locations can be provided with fast paging and acknowledgement slots, so that for instance every tenth frame can be a fast paging frame FP, and every tenth frame again an acknowledgement frame A. As in the drawing, fast paging and acknowledgement can also be combined to a fast paging and acknowledgement slot FP/A. Depending on the maximum length of the reservation time, the frequency of the control channels both in the uplink and in the downlink can be lower, for instance every ninth, every thirteenth etc. time slot, instead of every fifth as in FIG. 3.

FIGS. 2 and 3B depict two extreme cases for allocating the time slots. In between these cases there remain those where 2, 3, 4, 5, 6 or 7 time slots are allocated for packet data. The principle is evident on the basis of what is explained above, and these cases are not dealt with in more detail here. The number of the allocated time slots determines the transmission rate of packet data, which means that the required transmission rate can serve as one criteria for allocating the time slots.

The logical channel structure may be different in different cases where the number of time slots reserved for packet data also differs. If two times slots are reserved for packet data, one of them can be used for data only and the other for control (FP, A, R). Another possibility is to use one for data only, and the other for both control and data, because there is not much need for control with only two time slots in use. In this case a combined control/data slot has a smaller data capacity. When all I-channels are reserved for transmitting the user's packets, control is not needed any more. Now the control slot or the logical control channel can be granted for transmitting information data, i.e. more I-capacity is obtained. As soon as an I-channel becomes free, a new logical control channel must be created.

In FIG. 3B the control slot is repeated as every fifth time slot, but the repeating rate can also be other than that. The structure of the FP- and A-bursts can also depend on the number of allocated time slots, and they can also be combined, in the above described fashion, so that they share the same time slot, as is illustrated in FIG. 3B. Now for Instance every second control slot is paging and every second acknowledgement.

If the Invention is applied for example to the GSM or PCN systems, the suitable fields for paging and acknowledgement bursts would be such as are illustrated in FIG. 4 A. The fast paging FP needs the temporary subscriber identity of the mobile station MS, and the acknowledgement A needs a random number used on the R-slot as well as a timing advance TA. In the request, the mobile station transmits a random number, which the base station retransmits in its acknowledgement A in order to notify the mobile station that the transmitted message was received.

Figure 5:
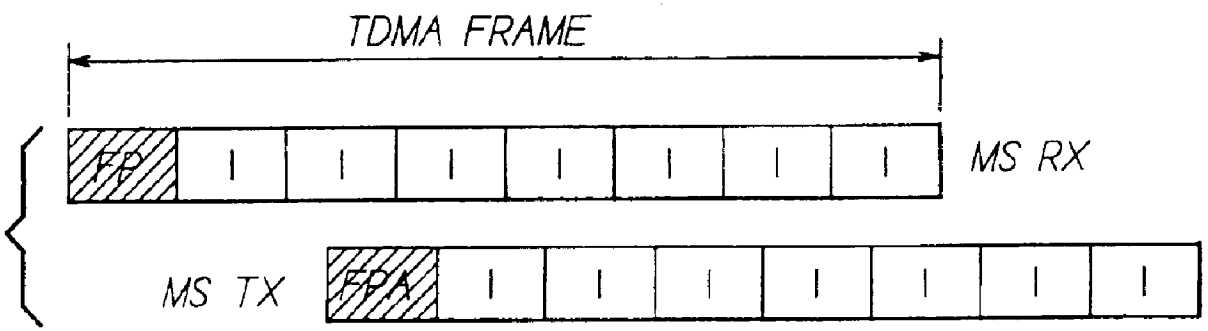
FIG. 5 depicts a case without any determined R-slots.

In the drawing of FIG. 3B, the R-slots in the uplink are permanent. This is not, however, compulsory. FIG. 5 illustrates an arrangement where the mobile station is not allocated a given R-slot for the access burst R in the uplink. In the downlink, there may be logically allocated connection-wise time slots for fast paging. The base station may transmit fast paging FP at regular intervals, and the paging may also contain an identifier of occupied uplink channels, such as a channel bitmap, which notifies which channels are free or occupied in the uplink. Therefore the control system of the radio resources of the base station must follow the used time slots.

According to FIG. 5, the base station transmits fast paging FP on one time slot of the TDMA frame. This is represented by the upper frame, which illustrates the reception of the mobile station MS. The mobile station acknowledges the paging on the respective time slot in the uplink. This is represented by the lower frame, which illustrates the frame of the mobile station MS in the uplink. However, the mobile station does not have a given R-slot for transmitting the access burst, but it may be transmitted on any one or several of The free time slots of the TDMA frame in the uplink. The base station acknowledges access on a downlink slot connected to this uplink slot. If the mobile station transmits an access burst for Instance on the third time slot, the base station acknowledges it on the following third time slot of its frame. The acknowledgement contains a reference to the allocated time slot. In case the corresponding downlink time slot required for acknowledgement is not free, but it is reserved for data transmission on another channel, the control burst simply steals this time slot for its own use. This means that if there is a need to transmit control data, and the required time slot is dedicated for transmitting information (I-slot), the problem is solved so that instead of the information of another channel, there is simply transmitted the control data, such as the said acknowledgement burst, provided with a steal flag. From the steal flag the mobile station subjected to stealing knows that there is a stolen time slot on which acknowledgement is transmitted to some other mobile station, and the expected information is not coming until the next time slot.

Figure 12:
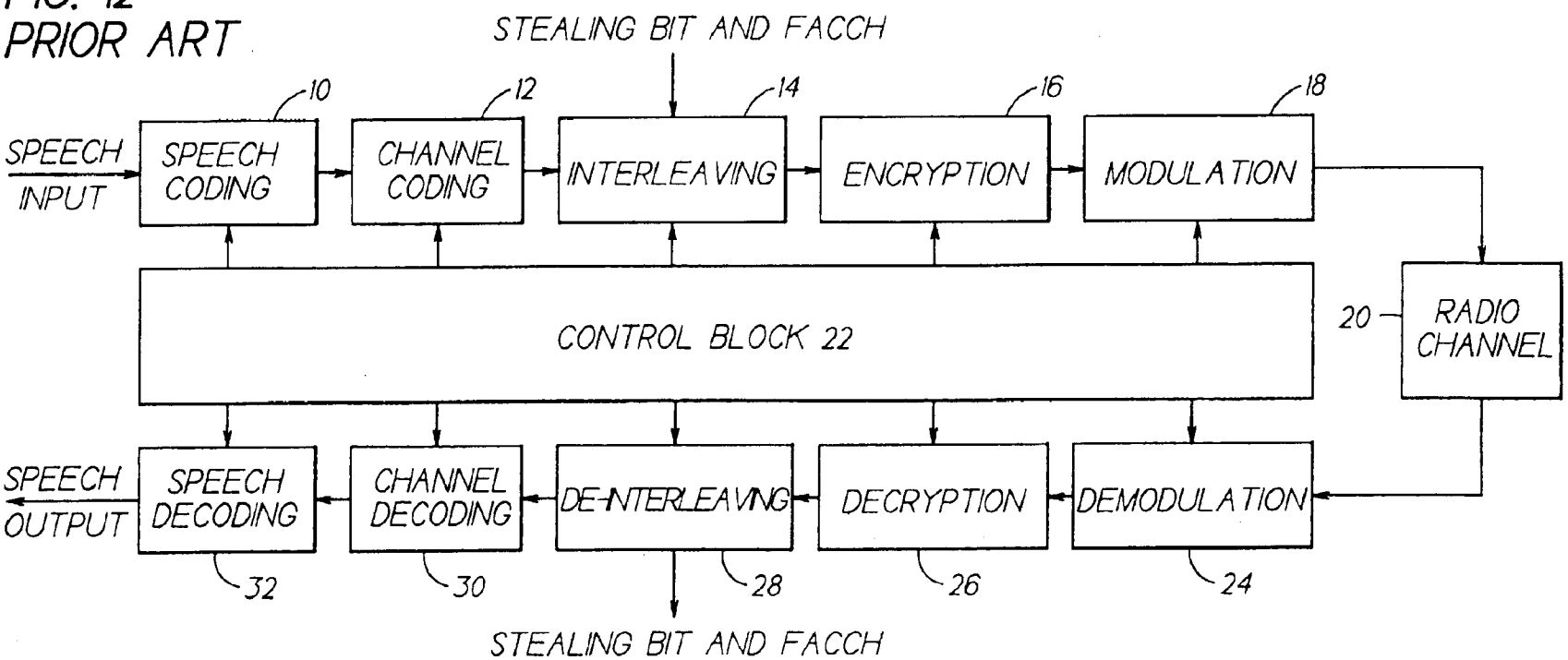
FIG. 12 PRIOR ART
FIG. 12 depicts a block diagram of a conventional implementation of logical channels in a mobile station and in a base station.

FIG. 4A depicted the fields of the fast paging/acknowledgement burst. FIG. 4B illustrates an access burst to be transmitted on an R-slot. The structure of a GSM access slot as such is not suited to be used on the R-slot in the system of the present information. The said access burst is presented in FIG. 4B. It contains a 41-bit synchronizing part and 36 encoded information bits, which result from an error correction algorithm for encoding a databit of 8 users. Eight databits are insufficient for the purposes of the present invention, wherefore their number must be increased. This is solved by applying a new encoding ratio. Accordingly, 12 databits and 6 CRC bits are encoded by applying ½ FEC (Forward Error Correction), resulting in 36 encoded bits. Thus at least 12 bits can be obtained for employed data instead of the 8 bits of GSM. Therefore the channel encoding must be changed. As an alternative, it is possible to apply the channel encoding method of the GSM access burst, so that only 8 databits are available. Now we have obtained 12 databits on an R-slot, and the databit number of the access burst has reached the aim, because the sum of the field of random reference number, with a length of 9 bits, and of the field giving the number of time slots, with a length of 3 bits, is exactly 12 bits. Alternatively, if the number of the bits informing the random reference is increased (in GSM the number is 5 bits), the data section of the same 12 bits can be used for informing some priority bits, too. These alternatives are illustrated in FIG. 4B. Random reference is applied in the same fashion as in the current GSM system, so that in its access burst the mobile station transmits a random number to the base station, which in its acknowledgement retransmits the same number plus channel information. Now the mobile station in question identifies the acknowledgement to be intended for it. FIG. 12 depicts a block diagram of a conventional implementation of logical channels in a mobile station and in a base station. At page 11, after line 12, insert the following paragraphs:

FIG. 12 is a block diagram of a conventional, prior art implementation of logical channels in a mobile station and in a base station. This conventional implementation is suitable for practicing the instant invention. On the transmitter side the error coding is performed in a channel coding block 12. If the input data is a speech signal, it is first coded in a speech coding block 10. The signal is then interleaved in an interleaving block 14, encrypted in an encryption block 16 and modulated to the carrier frequency in a modulation block 18. The modulated signal is then transmitted to the radio channel 20. The above-mentioned stealing bit is also set in the interleaving block 14, as controlled by a control block 22.

In the receiver side the carrier frequency signal is received from the radio channel 20 and is demodulated to the baseband frequency in a demodulation block 24. The signal is then decrypted in decryption block 26 and de-interleaved in a de-interleaving block 28, which also yields the stealing bit information for the control block 22. The error decoding is performed in a channel decoding block 30, and if the received data is speech, speech decoding is accomplished in a speech decoding block 32. All the mentioned transmitter and receiver blocks are controlled by the control block 22.

A more detailed description of the functions of the transmitter and receiver blocks can be found in, e.g., a publication by Michel Mouly and Marie-Bernadette Pautet; The GSM System for Mobile Communications, 1992, France.

Figure 6:
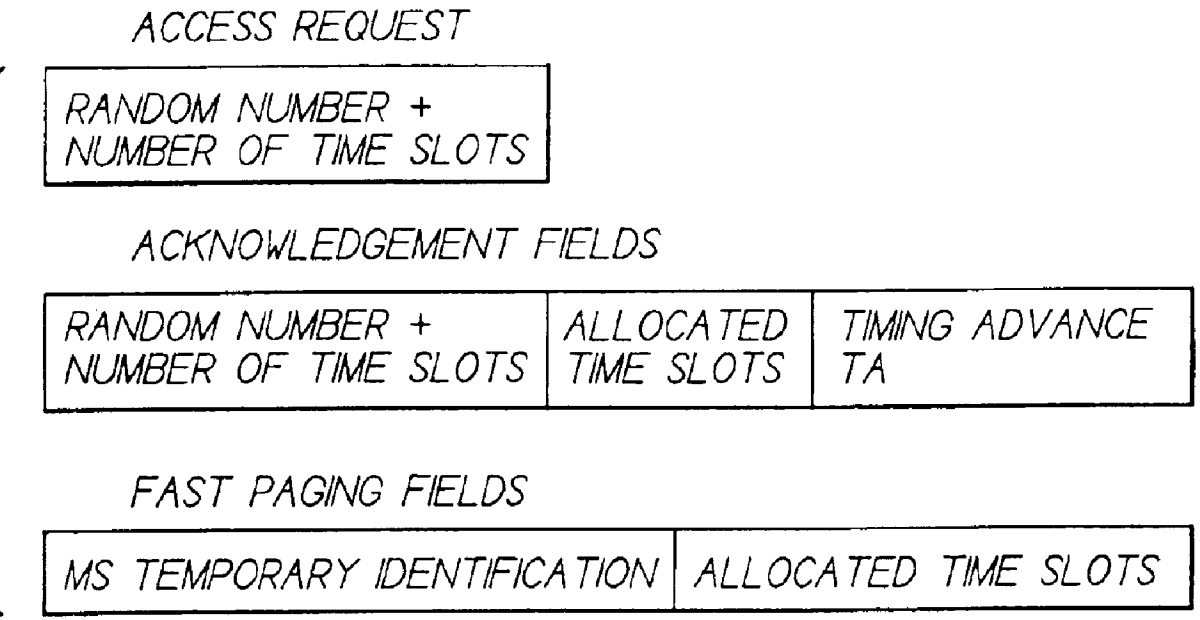
FIG. 6 depicts some structures of the control fields.

FIG. 6 illustrates a possible structure suggested for the fields of the R, A and FP slots. They are not GSM-specific. The acknowledgement of the access burst, constituting a random number and the number of desired time slots, is transmitted on an A-slot. The structure of the A-slot contains a random reference, a bitmap of the reserved channels and a time advance, calculated by the base station. Moreover, it may contain a reference to those time slots that were transmitted on the R-slot. This prevents the same channel from being granted to multiple subscribers. The fields of the fast paging contain the temporary identity of the mobile station and the bitmap of allocated time slots. The temporary identity of the mobile station is an identity used for the MS in the packet transmission mode.

In the above specification we have explained channel formation in general, but we have not paid attention to the direction of data packets. User information, i.e. data packets, are transmitted on I-slots reserved for the transmission of data packets by using normal bursts. Naturally a radio channel can be reserved symmetrically, by reserving an equal number of time slots in both directions. Generally data transmission is, however, asymmetric, and symmetric reservation means that resources are wasted in one of the directions.

An asymmetric transmission can be realized in two different ways. In the first alternative the MAC (Media Ascess Control) protocol is half duplex. The Information slots, I-slots, are reserved only in one direction at a time. MAC first investigates which direction the packet is going to be transmitted to, and reserves either an uplink or a downlink channel, according to the required direction. Acknowledgement is not used with information slots on the MAC level. Acknowledgements are carried by the link layer protocol, and for acknowledgement transmission there is reserved an information slot in similar fashion as for the user's data.

Figure 7A:
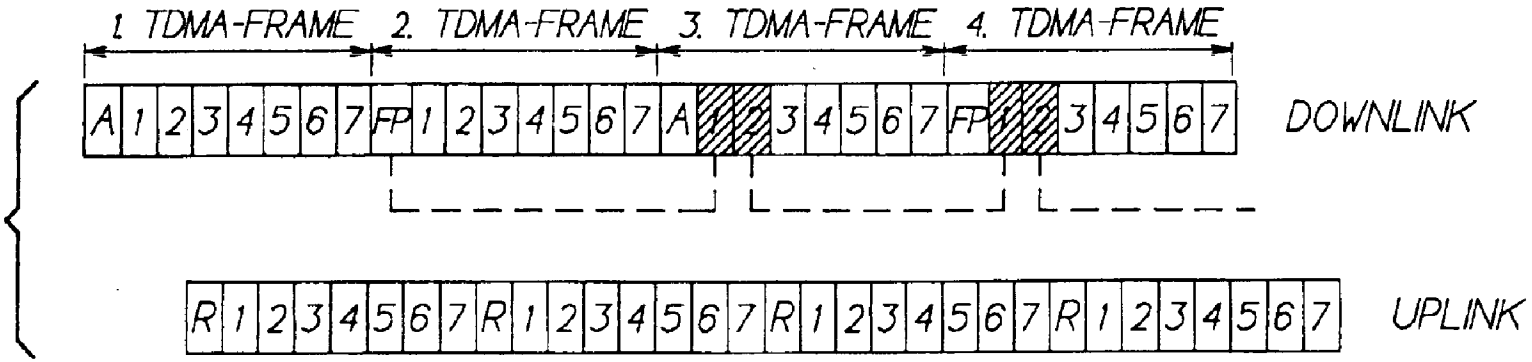
FIG. 7A depicts an asymmetric mobile terminated packet transmission.

FIG. 7A illustrates the time slot structure in an asymmetric mobile terminated transmission. In the downlink the base station transmits fast paging on a fast paging channel, in the drawing on the FP-slot of the second frame, to the mobile station and notifies that from now on it will transmit, from frame 3 onward, packet data for the mobile station on the first and second I-slots of the frames. Other time slots are reserved for other mobile stations or they are free. The downlink time slots connected with dotted lines depict the logical channel in this case. The downlink channel is reserved and a required amount of packets is transmitted. In the uplink there are not reserved any time slots for the same mobile station, but they can be used by other mobile stations of the cell.

Figure 7B:
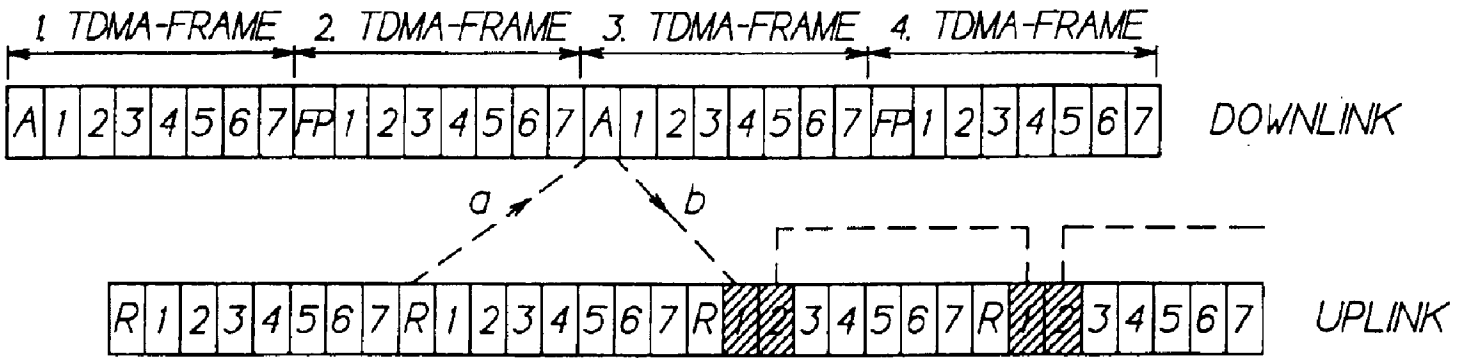
FIG. 7B depicts an asymmetric mobile originated packet transmission.

FIG. 7B illustrates a case of mobile originated transmission. The mobile station transmits a reservation request in the uplink on the R-slot, which request is acknowledged by the base station in the downlink, on a respective A-slot. This step is represented by the dotted line a. In The acknowledgement burst, the base station informs the mobile station that it has been allocated the uplink I-slots 1 and 2 for transmitting the packets. This step is represented by the dotted line b. Thereafter the mobile station transmits on the successive uplink frames, on their first and second information slots, packet data until everything is transmitted. In the downlink time slots are not reserved for the mobile station, but they are available for other use, which means that the resources are used more efficiently.

In the case of FIG. 7B, the mobile station transmits packets on the second and third time slots of the frame, i.e. on the first and second time slots allocated for data transmission proper. It is apparent from the drawing that on the downlink channel there are not transmitted acknowledgements that could be used for informing of possible errors occurred in the transmission. However, acknowledgement can be used when desired. In the acknowledgement, the base station receives and decodes the uplink MAC packet and transmits an acknowledgement on the A-slot of the following TDMA frame. Now the field structure of the A-slot burst, illustrated In FIG. 8, can be applied for the acknowledgement. This corresponds to the field structure of acknowledgement slot suggested in FIG. 6, with slight modifications. The addition is a bitmap indicating the correctness of previously received MAC frames; in every slot, the base station checks the error correction field of the received MAC packet and sets the corresponding bit to 1 if the reception was correct, and to 0 in case the reception was incorrect. If the entire carrier of 8 slots is selected, the bitmap for all slots could be "11111111", which would stand for correct reception of packets on all time slots. The same bitmap is transmitted to the mobile station during the next packet, for example during four TDMA frames, if the duration of the packet is four bursts and the Interleaving depth is 4.

Another possibility for asymmetric transmission is to use only one slot for acknowledgements and as many slots as are needed for information transmission. FIG. 9 gives an example of this. Accordingly, the mobile station requests a channel in the uplink on the reservation slot R. The base station receives the request and acknowledges it on the acknowledgement slot A. This step is represented by the dotted line c. On the acknowledgement burst, the base station notifies the mobile station that it is allocated the I-slots 1–6 for mobile originated transmission of packet data. This step is represented by the dotted line d. The mobile station transmits on these time slots 1–6, whereafter the base station acknowledges the data transmitted within the frame on a downlink slot reserved for acknowledgement, which here is the second slot of the frame (=1st I-slot). This step is represented by the dotted line e. The mobile station receives the acknowledgement, step f, and transmits again on the slots 1–6 of the next frame. This is repeated as long as there is data to be transmitted. In the drawing, the darker squares represent those slots that are reserved for one connection only. The asymmetrically is thus clearly visible. It is also pointed only that in between successive bursts, there can be applied frequency hopping, i.e. the consecutive slots of a frame use different physical channels.

FIG. 10 illustrates a symmetric transmission. Data is transmitted in one direction, and the corresponding slot of the opposite direction is used for acknowledgements. In the drawing the mobile station requests a channel on the R-slot, which request is acknowledged by the base station in the downlink acknowledgement burst on an A-slot. The mobile station is allocated one slot, which is the first information slot I. On this slot, it transmits a packet burst, which is acknowledged by the base station on the first corresponding slot. Thus the transmission and acknowledgement alternate on corresponding slots in the uplink and downlink directions. Other slots are free or used by other mobile stations, and part may be reserved for circuit switched services.

The mobile station MS and the packet arrangement in the network may exchange various parameters at the beginning of the packet session. This is useful because thus the mobile station informs the network as to the number of the slots in the TDMA frame that it can handle during data transmission. The mobile station can be so simple in structure that it is capable of dealing with only one slot, whereas the network can handle all slots of the frame. When the mobile station informs the network of this feature at the beginning of the session, the network immediately knows to allocate only one slot for the mobile station. At the beginning the network also informs the mobile station as to the packet slots in the network, so that the mobile station finds out what kind of logical channel structure the cell has.

Irrespective of the form of the access burst, the system allows for a priority value to be included in the reservation request on the R-slot. There can be several different priority levels with different binary values. In the base station, the queue system may observe the priority of the data transmission requests. There is a maximum time value, for the duration when random access is valid. This prevents an incorrect use of the timing advance. When the base station receives the R-slot, it arranges the received requests in a queue. The channels reserved in the requests are allocated either in the FCFS order, or based on the priorised FCFS, if the request includes a priority value. The base station must include a time stamp for each received R-slot in order to keep track of the requests for which the maximum timing has been exceeded. Timing reserves a given duration for the request to be valid, and if the timer elapses before the request is fulfilled, it is removed from the queue.

Figure 11:
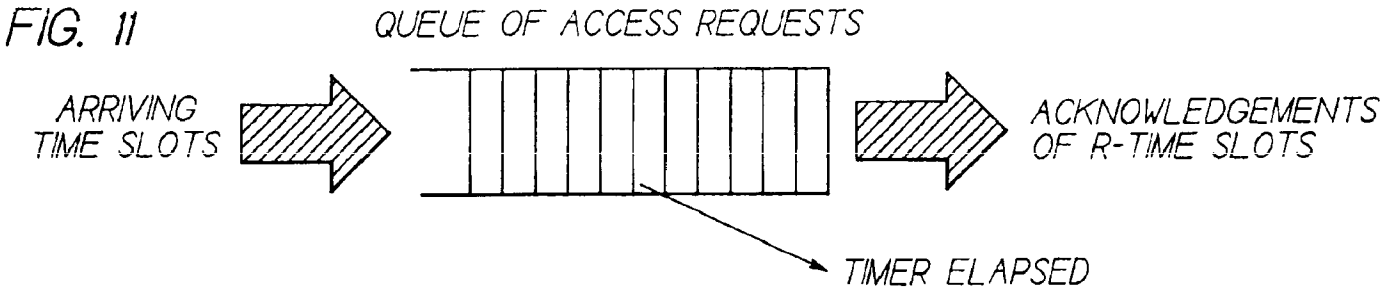
FIG. 11 depicts the access server queue principle.

FIG. 11 illustrates the queue principle. When the access server receives an R-slot, it inserts it in the queue. The server selects the request having next turn, i.e. being oldest in duration or highest in priority, and finds out whether a requested number of slots is available. If there are enough free slots, the acknowledgement is transmitted on an A-slot.

If there are not as many free slots as was requested, there are two possibilities: 1) the request is queued until a sufficient amount of free capacity is found, or 2) the mobile station is given as many slots as there are free. In the first case, a message must be sent to the mobile station on the acknowledgement slot. This prevents unnecessary timer expiration. For those R-slots for which the time has elapsed, a retransmission algorithm is used, The present invention can be applied to any digital TDMA cellular system. It is not necessary to alter the burst structure of the systems where the invention is applied, for instance GSM and PCN systems. The structure of logical channels renders several different possibilities and enables a dynamic allocation of resources and a flexible access protocol.

When applying the system of the invention to a GSM system, there are three different modes available:

1. Idle: the mobile station does not use packet data services, but only circuit switched services. Now it works as the current GSM phone.

2. Packet half active: the mobile station is in virtual connection state for packet services (no physical channel), but is currently not in the receiving or transmitting data state. It is listening to the standard GSM paging channel to receive data packets. In this mode, only the paging channel is listened to, which saves the batteries because listening takes place fairly seldom. When a packet is coming in, there is transmitted an ordinary paging, the reason code being "arrival of packet". Now the mobile station shifts to mode 3, where it listens to the FP channel and can receive the packet.

3. Packet active: the mobile station is transmitting or receiving packet data. When not actively transmitting a packet, it listens to the FP channel to receive packets, as well as to the standard GSM paging to receive speech. This is called the FP DRX state (Fast Paging Discontinuous Reception).

When the transmission of packets in mode 3 is interrupted for some reason, the timer is started. When it elapses to a predetermined value, the mobile station is shifted from mode 3 to mode 2, so that the physical channel becomes free. When the mobile station requests to initiate virtual connection, it exchanges parameters with the network, such as exchange of encryption keys, initiation of encryption, identification etc. At the beginning of the virtual connection, the mobile station informs the network of the number of time slots that it is made for. Thus the network knows not to transmit data on eight slots, if the mobile station is made for one slot only.

What we claim is:

1. A method for transmitting packet data in the air interface of a digital cellular system based on time division multiple access (TDMA), the system comprising a communications network having at least one base station which serves a cell with wireless bidirectional communications using uplink and downlink time slots a plurality of which comprise an uplink and a downlink TDMA frame, respectively, the system further having at least one mobile station located within the cell, comprising the steps of:

defining downlink logical channels from the base station to the cell, the downlink logical channels being defined to comprise information channels designated for information transmission, the downlink logical channels using the downlink time slots, defining downlink control channels which include at least one of a paging channel (FP) and an acknowledgement channel (A), of which on the paging channel the base station notifies a mobile station located within the cell of an incoming packet data transmission that is addressed to the mobile station, as well as information channels for transmitting the incoming packet data, the downlink control channels also using the downlink time slots, defining uplink logical channels from the mobile station to the base station, the uplink logical channels being defined to comprise information channels reserved for information transmission and a reservation request channel (R), the uplink logical channels using the uplink time slots, making a request to the base station from the mobile station on the reservation request channel to reserve a connection for transmitting packet data, and acknowledging the request by the base station on the acknowledgement channel by identifying those information channels on which the mobile station is to transmit packet data, wherein in the TDMA frames there is assigned at any given time a variable number of time slots designated for packet data transmission, the number of assigned time slots being a function of one of a symmetricity and an asymmetricity of the packet data transmission, and also on a total demand for packet data transmission in the cell, and wherein any of the downlink time slots in the TDMA frame assigned for packet data transmission can be used for the paging (FP) channel and the acknowledgement (A) channel, and any of the uplink time slots in the TDMA frame that are assigned for packet data transmission can be used for the reservation request (R) channel.

2. A method according to claim 1, wherein on each time slot, transmitted data is subjected to the same interleaving and error correction algorithm, and wherein respective time slots of consecutive TDMA frames constitute independent logical sub-channels which are reserved for a mobile station according to need, and to which the packet data is applied at the beginning of the transmission and wherefrom it is again composed after the transmission.

3. A method according to claim 1, wherein the base station acknowledges the reservation request on a downlink time slot which corresponds to an uplink time slot wherein the request was transmitted, and in the event that the corresponding downlink time slot is occupied for transmitting information to another mobile station, the corresponding downlink time slot is stolen to be used as an acknowledgement time slot, and the information is transmitted later to the another mobile station.

4. A method according to claim 1, wherein the reservation request is an access burst, and wherein in an information bit part of the access burst there is encoded 12 databits by ½ FEC (Forward Error Correction) coding.

5. A method according to claim 1, wherein for a case where the transmission is asymmetric and terminated at the mobile station, the base station indicates to the mobile station on the paging channel on which downlink slots the packet data is transmitted such that a channel is reserved in only one direction at a time for the mobile station, while the time slots of the uplink TDMA frame are available for use by other mobile stations that are located in the cell.

6. A method according to claim 1, wherein for a case where the transmission is asymmetric and originated by the mobile station, the mobile station requests the base station to reserve a connection, which request is acknowledged by the base station on a respective acknowledgement time slot, and at the same time the base station allocates uplink information time slots in which the originating mobile station transmits packet data, wherein information time slots are not reserved in the downlink direction and are available for other use.

7. A method according to claim 6, wherein for each TDMA frame, after the mobile station has transmitted packet data in the allocated time slots, the base station transmits an acknowledgement on a downlink acknowledgement time slot.

8. A method according to claim 1, wherein for the case where the transmission is symmetric and is originated by or terminated by the mobile station, the transmission of packet data alternates on corresponding uplink and downlink time slots.

9. A method according to claim 1, wherein for the case where the transmission is symmetric and is originated by or terminated by the mobile station, only data packets are transmitted in one direction, and only acknowledgements are transmitted in the opposite direction.

10. A method according to claim 9, wherein the transmission of data packets and the corresponding acknowledgements are transmitted so as to alternate on corresponding uplink and downlink time slots.

11. A method according to claim 1, wherein a mobile station that is capable of packet transmission with fewer time slots than are supported by the base station, the mobile station performs a step of determining a number of time slots to use during a TDMA frame.

12. A method according to claim 1, wherein for packet data transmission there are reserved two time slots, one of which is reserved for transmitting control information and the other of which is reserved for transmitting the packet data.

13. A method according to claim 1, wherein for packet data transmission there are reserved two time slots, one of which is reserved solely for transmitting the packet data and the other of which is reserved for transmitting both control information and also the packet data.

14. A method according to claim 13, wherein for the case where the information time slots are reserved for some other use, the information time slots are stolen for transmitting packet data, and wherein if control time slots are not needed, the unneeded control time slots are used for transmitting packet data.

15. A method for transmitting packet data in the air interface of a digital cellular system based on time division multiple access (TDMA) having uplink and downlink time slots a plurality of which comprise an uplink and a downlink TDMA frame, respectively, comprising the steps of:

defining downlink logical channels from a base station to a cell served by the base station, the downlink logical channels being defined to comprise information channels and control channels, the downlink logical channels using the downlink time slots; and defining uplink logical channels from a mobile station to a base station, the uplink logical channels being defined to comprise information channels reserved for information transmission and a reservation request channel (R), on which the mobile station requests the reservation of a connection for transmitting packet data, the uplink logical channels using the uplink time slots; wherein in the TDMA frames a variable number of time slots are allocated for packet data transmission, the number of assigned time slots being a function of one of a symmetricity and an asymmetricity of the packet data transmission, and also on a total demand for packet data transmission in the cell.

16. A method according to claim 1, wherein for packet data transmission there are reserved n time slots, one of which is reserved for transmitting control information and packet data and the other of which is reserved solely for transmitting the packet data.

17. A method for transmitting packet data in the air interface of a digital cellular system based on time division multiple access (TDMA) having uplink and downlink time slots a plurality of which comprise an uplink and a downlink TDMA frame, respectively, comprising the steps of:

defining downlink logical channels from a base station to a cell served by the base station, the downlink logical channels being defined to comprise information channels and control channels, the downlink logical channels using the downlink time slots; and defining uplink logical channels from a mobile station to a base station, the uplink logical channels being defined to comprise information channels reserved for information transmission and a reservation request channel (R), on which the mobile station requests the reservation of a connection for transmitting packet data, the uplink logical channels using the uplink time slots; wherein in the TDMA frames a variable number of time slots are allocated for packet data transmission, the number of assigned time slots being a function of one of a symmetricity and an asymmetricity of the packet data transmission, and also on a total demand for packet data transmission in the cell, and wherein for packet data transmission there are reserved n time slots, one of which is reserved for transmitting control information and packet data and the other of which is reserved solely for transmitting the packet data.

18. A method for transmitting packet data in the air interface of a digital cellular system based on time division multiple access (TDMA) having uplink and downlink time slots a plurality of which comprise an uplink and a downlink TDMA frame, respectively, comprising the steps of:

defining downlink logical channels from a base station to a cell served by the base station, the downlink logical channels being defined to comprise information channels and control channels, the downlink logical channels using the downlink time slots; and defining uplink logical channels from a mobile station to a base station, the uplink logical channels being defined to comprise information channels reserved for information transmission and a reservation request channel (R), on which the mobile station requests the reservation of a connection for transmitting packet data, the uplink logical channels using the uplink time slots; wherein in the TDMA frames a variable number of time slots are allocated for packet data transmission, the number of assigned time slots being a function of one of a symmetricity and an asymmetricity of the packet data transmission, and also on a total demand for packet data transmission in the cell, and wherein the base station acknowledges the mobile station's reservation request on a downlink time slot which corresponds to an uplink time slot wherein the reservation request was transmitted, and in the event that the corresponding downlink time slot is assigned for transmitting information to another mobile station, the corresponding downlink time slot is stolen by the base station for use in transmitting the acknowledgment time slot, and the information is transmitted later to the other mobile station.

19. A method for transmitting packet data in the air interface of a digital cellular system based on time division multiple access (TDMA) having uplink and downlink time slots a plurality of which comprise an uplink and a downlink TDMA frame, respectively, comprising the steps of:

defining downlink logical channels from a base station to a cell served by the base station, the downlink logical channels being defined to comprise information channels and control channels, the downlink logical channels using the downlink time slots; and defining uplink logical channels from a mobile station to a base station, the uplink logical channels being defined to comprise information channels reserved for information transmission and a reservation request channel (R), on which the mobile station requests the reservation of a connection for transmitting packet data, the uplink logical channels using the uplink time slots; wherein in the TDMA frames a variable number of time slots are allocated for packet data transmission, the number of assigned time slots being a function of one of a symmetricity and an asymmetricity of the packet data transmission, and also on a total demand for packet data transmission in the cell, and wherein for the case wherein the transmission is symmetric and is originated by or terminated by the mobile station, only data packets are transmitted in one direction, and only acknowledgements are transmitted in the opposite direction.

*20. A method for transmitting packet data in the air interface of a digital cellular system based on time division multiple access (TDMA), the system comprising a communications network having at least one base station which serves a cell with wireless bidirectional communications using uplink and downlink time slots a plurality of which comprise an uplink and a downlink TDMA frame, respectively, the system further having at least one mobile station located within the cell, comprising the steps of:*

*defining downlink logical channels from the base station to the cell, the downlink logical channels being defined to comprise information channels designated for information transmission, the downlink logical channels using the downlink time slots,*

*defining downlink control channels which include at least one of a paging channel (FP) and an acknowledgement channel (A), of which on the paging channel the base station notifies a mobile station located within the cell of an incoming packet data transmission that is addressed to the mobile station, as well as information channels for transmitting the incoming packet data, the downlink control channels also using the downlink time slots,*

*defining uplink logical channels from the mobile station to the base station, the uplink logical channels being defined to comprise information channels reserved for information transmission and a reservation request channel (R), the uplink logical channels using the uplink time slots,*

*making a request to the base station from the mobile station on the reservation request channel to reserve a connection for transmitting packet data, and*

*acknowledging the request by the base station on the acknowledgement channel by identifying those information channels on which the mobile station is to transmit packet data, wherein*

*in the TDMA frames there is assigned at any given time a variable number of time slots designated for packet data transmission, the number of assigned time slots*

*being a function of one of a symmetricity and an asymmetricity of the packet data transmission, and wherein*

*any of the downlink time slots in the TDMA frame assigned for packet data transmission can be used for the paging (FP) channel and the acknowledgement (A) channel, and any of the uplink time slots in the TDMA frame that are assigned for packet data transmission can be used for the reservation request (R) channel.*

*21. A method according to claim 20, wherein on each time slot, transmitted data is subjected to the same interleaving and error correction algorithm, and wherein respective time slots of consecutive TDMA frames constitute independent logical sub-channels which are reserved for a mobile station according to need, and to which the packet data is applied at the beginning of the transmission and wherefrom it is again composed after the transmission.*

*22. A method according to claim 20, wherein the base station acknowledges the reservation request on a downlink time slot which corresponds to an uplink time slot wherein the request was transmitted, and in the event that the corresponding downlink time slot is occupied for transmitting information to another mobile station, the corresponding downlink time slot is stolen to be used as an acknowledgment time slot, and the information is transmitted later to the another mobile station.*

*23. A method according to claim 20, wherein the reservation request is an access burst, and wherein in an information bit part of the access burst there is encoded 12 databits by ½ FEC (Forward Error Correction) coding.*

*24. A method according to claim 20, wherein for a case where the transmission is asymmetric and terminated at the mobile station, the base station indicates to the mobile station on the paging channel on which downlink slots the packet data is transmitted such that a channel is reserved in only one direction at a time for the mobile station, while the time slots of the uplink TDMA frame are available for use by other mobile stations that are located in the cell.*

*25. A method according to claim 20, wherein for a case where the transmission is asymmetric and originated by the mobile station, the mobile station requests the base station to reserve a connection, which request is acknowledged by the base station on a respective acknowledgement time slot, and at the same time the base station allocates uplink information time slots in which the originating mobile station transmits packet data, wherein information time slots are not reserved in the downlink direction and are available for other use.*

*26. A method according to claim 25, wherein for each TDMA frame, after the mobile station has transmitted packet data in the allocated time slots, the base station transmits an acknowledgement on a downlink acknowledgement time slot.*

*27. A method according to claim 20, wherein for the case where the transmission is symmetric and is originated by or terminated by the mobile station, the transmission of packet data alternates on corresponding uplink and downlink time slots.*

*28. A method according to claim 20, wherein for the case where the transmission is symmetric and is originated by or terminated by the mobile station, only data packets are transmitted in one direction, and only acknowledgements are transmitted in the opposite direction.*

*29. A method according to claim 28, wherein the transmission of data packets and the corresponding acknowledgements are transmitted so as to alternate on corresponding uplink and downlink time slots.*

*30. A method according to claim 20, wherein a mobile station that is capable of packet transmission with fewer time slots than are supported by the base station, the mobile station performs a step of determining a number of time slots to use during a TDMA frame.*

*31. A method according to claim 20, wherein for packet data transmission there are reserved two time slots, one of which is reserved for transmitting control information and the other of which is reserved for transmitting the packet data.*

*32. A method according to claim 20, wherein for packet data transmission there are reserved two time slots, one of which is reserved solely for transmitting the packet data and the other of which is reserved for transmitting both control information and also the packet data.*

*33. A method according to claim 32, wherein for the case where the information time slots are reserved for some other use, the information time slots are stolen for transmitting packet data, and wherein if control time slots are not needed, the unneeded control time slots are used for transmitting packet data.*

*34. A method for transmitting packet data in the air interface of a digital cellular system based on time division multiple access (TDMA) having uplink and downlink time slots a plurality of which comprise an uplink and a downlink TDMA frame, respectively, comprising the steps of:*

*defining downlink logical channels from a base station to a cell served by the base station, the downlink logical channels being defined to comprise information channels and control channels, the downlink logical channels using the downlink time slots; and*

*defining uplink logical channels from a mobile station to a base station, the uplink logical channels being defined to comprise information channels reserved for information transmission and a reservation request channel (R), on which the mobile station requests the reservation of a connection for transmitting packet data, the uplink logical channels using the uplink time slots; wherein*

*in the TDMA frames a number of the uplink logical channels and downlink logical channels are allocated for packet data transmission, each uplink logical channel having a variable number of uplink time slots and each downlink logical channel having a variable number of downlink time slots, the number of allocated time slots in each logical channel being a function of one of a symmetricity and an asymmetricity of the packet data transmission, the total number of allocated time slots for said mobile station being either an even number or an odd number.*

*35. A method according to claim 34, wherein for packet data transmission there are reserved n time slots, one of which is reserved for transmitting control information and packet data and the other of which is reserved solely for transmitting the packet data.*

*36. A method for transmitting packet data in the air interface of a digital cellular system based on time division multiple access (TDMA) having uplink and downlink time slots a plurality of which comprise an uplink and a downlink TDMA frame, respectively, comprising the steps of:*

*defining downlink logical channels from a base station to a cell served by the base station, the downlink logical channels being defined to comprise information channels and control channels, the downlink logical channels using the downlink time slots; and*

*defining uplink logical channels from a mobile station to a base station, the uplink logical channels being*

*defined to comprise information channels reserved for information transmission and a reservation request channel (R), on which the mobile station requests the reservation of a connection for transmitting packet data, the uplink logical channels using the uplink time slots; wherein*

*in the TDMA frames a number of the uplink logical channels and downlink logical channels are allocated for packet data transmission, each uplink logical channel having a variable number of uplink time slots and each downlink logical channel having a variable number of downlink time slots, the number of allocated time slots in each logical channel being a function of one of a symmetricity and an asymmetricity of the packet data transmission, the total number of allocated time slots for said mobile station being either an even number or an odd number;*

*for packet data transmission there are reserved n time slots, one of which is reserved for transmitting control information and packet data and the other of which is reserved solely for transmitting the packet data.*

*37. A method for transmitting packet data in the air interface of a digital cellular system based on time division multiple access (TDMA) having uplink and downlink time slots a plurality of which comprise an uplink and a downlink TDMA frame, respectively, comprising the steps of:*

*defining downlink logical channels from a base station to a cell served by the base station, the downlink logical channels being defined to comprise information channels and control channels, the downlink logical channels using the downlink time slots; and*

*defining uplink logical channels from a mobile station to a base station, the uplink logical channels being defined to comprise information channels reserved for information transmission and a reservation request channel (R), on which the mobile station requests the reservation of a connection for transmitting packet data, the uplink logical channels using the uplink time slots; wherein*

*in the TDMA frames a variable number of time slots are allocated for packet data transmission, the number of assigned time slots being a function of one of a symmetricity and an asymmetricity of the packet data transmission, and wherein*

*the base station acknowledges the mobile station's reservation request on a downlink time slot which corresponds to an uplink time slot wherein the reservation request was transmitted, and in the event that the corresponding downlink time slot is assigned for transmitting information to another mobile station, the corresponding downlink time slot is stolen by the base station for use in transmitting the acknowledgment time slot, and the information is transmitted later to the other mobile station.*

*38. A method for transmitting packet data in the air interface of a digital cellular system based on time division multiple access (TDMA) having uplink and downlink time slots a plurality of which comprise an uplink and a downlink TDMA frame, respectively, comprising the steps of:*

*defining downlink logical channels from a base station to a cell served by the base station, the downlink logical channels being defined to comprise information channels and control channels, the downlink logical channels using the downlink time slots; and*

*defining uplink logical channels from a mobile station to a base station, the uplink logical channels being defined to comprise information channels reserved for information transmission and a reservation request channel (R), on which the mobile station requests the reservation of a connection for transmitting packet data, the uplink logical channels using the uplink time slots; wherein*

*in the TDMA frames a number of the uplink logical channels and downlink logical channels are allocated for packet data transmission, each uplink logical channel having a variable number of uplink time slots and each downlink logical channel having a variable number of downlink time slots, the number of allocated time slots in each logical channel being a function of one of a symmetricity and an asymmetricity of the packet data transmission, the total number of allocated time slots for said mobile station being either an even number or an odd number;*

*for the case where the transmission is symmetric and is originated by or terminated by the mobile station, only data packets are transmitted in one direction, and only acknowledgements are transmitted in the opposite direction.*

*39. A method for transmitting packet data in the air interface of a digital cellular system based on time division multiple access (TDMA), the system comprising a communications network having at least one base station which serves a cell with wireless bidirectional communications using uplink and downlink time slots a plurality of which comprise an uplink and a downlink TDMA frame, respectively, the system further having at least one mobile station located within the cell, comprising the steps of:*

*defining downlink logical channels from the base station to the cell, the downlink logical channels being defined to comprise information channels designated for information transmission, the downlink logical channels using the downlink time slots,*

*defining downlink control channels which include at least one of a paging channel (FP) and an acknowledgement channel (A), of which on the paging channel the base station notifies a mobile station located within the cell of an incoming packet data transmission that is addressed to the mobile station, as well as information channels for transmitting the incoming packet data, the downlink control channels also using the downlink time slots,*

*defining uplink logical channels from the mobile station to the base station, the uplink logical channels being defined to comprise information channels reserved for information transmission and a reservation request channel (R), the uplink logical channels using the uplink time slots,*

*making a request to the base station from the mobile station on the reservation request channel to reserve a connection for transmitting packet data, and*

*acknowledging the request by the base station on the acknowledgement channel by identifying those information channels on which the mobile station is to transmit packet data, wherein*

*in the uplink and the downlink TDMA frames there is assigned at any given time a variable number of time slots designated for packet data transmission, the respective number of assigned uplink time slots and downlink time slots being one of an equal number and an unequal number, in dependence upon the demand for packet data transmission in the uplink direction and respectively upon the demand for packet data transmission in the downlink direction, and wherein*

*any of the downlink time slots in the TDMA frame assigned for packet data transmission can be used for the paging (FP) channel and the acknowledgement (A) channel, and any of the uplink time slots in the TDMA frame that are assigned for packet data transmission can be used for the reservation request (R) channel.*

*40. A method according to claim 39, wherein on each time slot, transmitted data is subjected to the same interleaving and error correction algorithm, and wherein respective time slots of consecutive TDMA frames constitute independent logical sub-channels which are reserved for a mobile station according to need, and to which the packet data is applied at the beginning of the transmission and wherefrom it is again composed after the transmission.*

*41. A method according to claim 39, wherein the base station acknowledges the reservation request on a downlink time slot which corresponds to an uplink time slot wherein the request was transmitted, and in the event that the corresponding downlink time slot is occupied for transmitting information to another mobile station, the corresponding downlink time slot is stolen to be used as an acknowledgment time slot, and the information is transmitted later to the another mobile station.*

*42. A method according to claim 39, wherein the reservation request is an access burst, and wherein in an information bit part of the access burst there is encoded 12 databits by ½ FEC (Forward Error Correction) coding.*

*43. A method according to claim 39, wherein for a case where the transmission is asymmetric and terminated at the mobile station, the base station indicates to the mobile station on the paging channel on which downlink slots the packet data is transmitted such that a channel is reserved in only one direction at a time for the mobile station, while the time slots of the uplink TDMA frame are available for use by other mobile stations that are located in the cell.*

*44. A method according to claim 39, wherein for a case where the transmission is asymmetric and originated by the mobile station, the mobile station requests the base station to reserve a connection, which request is acknowledged by the base station on a respective acknowledgement time slot, and at the same time the base station allocates uplink information time slots in which the originating mobile station transmits packet data, wherein information time slots are not reserved in the downlink direction and are available for other use.*

*45. A method according to claim 44, wherein for each TDMA frame, after the mobile station has transmitted packet data in the allocated time slots, the base station transmits an acknowledgement on a downlink acknowledgement time slot.*

*46. A method according to claim 39, wherein for the case where the transmission is symmetric and is originated by or terminated by the mobile station, the transmission of packet data alternates on corresponding uplink and downlink time slots.*

*47. A method according to claim 39, wherein for the case where the transmission is symmetric and is originated by or terminated by the mobile station, only data packets are transmitted in one direction, and only acknowledgements are transmitted in the opposite direction.*

*48. A method according to claim 47, wherein the transmission of data packets and the corresponding acknowledgements are transmitted so as to alternate on corresponding uplink and downlink time slots.*

*49. A method according to claim 39, wherein a mobile station that is capable of packet transmission with fewer time slots than are supported by the base station, the mobile station performs a step of determining a number of time slots to use during a TDMA frame.*

*50. A method according to claim 39, wherein for packet data transmission there are reserved two time slots, one of which is reserved for transmitting control information and the other of which is reserved for transmitting the packet data.*

*51. A method according to claim 39, wherein for packet data transmission there are reserved two time slots, one of which is reserved solely for transmitting the packet data and the other of which is reserved for transmitting both control information and also the packet data.*

*52. A method according to claim 51, wherein for the case where the information time slots are reserved for some other use, the information time slots are stolen for transmitting packet data, and wherein if control time slots are not needed, the unneeded control time slots are used for transmitting packet data.*

*53. A method for transmitting packet data in the air interface of a digital cellular system based on time division multiple access (TDMA) having uplink and downlink time slots a plurality of which comprise an uplink and a downlink TDMA frame, respectively, comprising the steps of:*

*defining downlink logical channels from a base station to a cell served by the base station, the downlink logical channels being defined to comprise information channels and control channels, the downlink logical channels using the downlink time slots; and*

*defining uplink logical channels from a mobile station to a base station, the uplink logical channels being defined to comprise information channels reserved for information transmission and a reservation request channel (R), on which the mobile station requests the reservation of a connection for transmitting packet data, the uplink logical channels using the uplink time slots; wherein*

*in the uplink and the downlink TDMA frames a number of the uplink logical channels and downlink logical channels are allocated for packet data transmission, each uplink logical channel having a variable number of uplink time slots and each downlink logical channel having a variable number of downlink time slots, the respective number of allocated uplink time slots in an uplink logical channel and downlink time slots in a downlink logical channel being one of an equal number and an unequal number, in dependence upon the demand for packet data transmission in the uplink direction and respectively upon the demand for packet data transmission in the downlink direction, the total number of allocated time slots for said mobile station being either an even number or an odd number.*

*54. A method according to claim 53, wherein for packet data transmission there are reserved n time slots, one of which is reserved for transmitting control information and packet data and the other of which is reserved solely for transmitting the packet data.*

*55. A method for transmitting packet data in the air interface of a digital cellular system based on time division multiple access (TDMA) having uplink and downlink time slots a plurality of which comprise an uplink and a downlink TDMA frame, respectively, comprising the steps of:*

*defining downlink logical channels from a base station to a cell served by the base station, the downlink logical channels being defined to comprise information channels and control channels, the downlink logical channels using the downlink time slots; and*

*defining uplink logical channels from a mobile station to a base station, the uplink logical channels being*

*defined to comprise information channels reserved for information transmission and a reservation request channel (R), on which the mobile station requests the reservation of a connection for transmitting packet data, the uplink logical channels using the uplink time slots; wherein*

*in the uplink and the downlink TDMA frames a number of the uplink logical channels and downlink logical channels are allocated for packet data transmission, each uplink logical channel having a variable number of uplink time slots and each downlink logical channel having a variable number of downlink time slots, the respective number of allocated uplink time slots in an uplink logical channel and downlink time slots in a downlink logical channel being one of an equal number and an unequal number, in dependence upon the demand for packet data transmission in the uplink direction and respectively upon the demand for packet data transmission in the downlink direction, the total number of allocated time slots for said mobile station being either an even number or an odd number;*

*for packet data transmission there are reserved n time slots, one of which is reserved for transmitting control information and packet data and the other of which is reserved solely for transmitting the packet data.*

*56. A method for transmitting packet data in the air interface of a digital cellular system based on time division multiple access (TDMA) having uplink and downlink time slots a plurality of which comprise an uplink and a downlink TDMA frame, respectively, comprising the steps of:*

*defining downlink logical channels from a base station to a cell served by the base station, the downlink logical channels being defined to comprise information channels and control channels, the downlink logical channels using the downlink time slots; and*

*defining uplink logical channels from a mobile station to a base station, the uplink logical channels being defined to comprise information channels reserved for information transmission and a reservation request channel (R), on which the mobile station requests the reservation of a connection for transmitting packet data, the uplink logical channels using the uplink time slots; wherein*

*in the uplink and the downlink TDMA frames a variable number of time slots are allocated for packet data transmission, the respective number of assigned uplink time slots and downlink time slots being one of an equal number and an unequal number in dependence upon the demand for packet data transmission in the uplink direction and respectively upon the demand for packet data transmission in the downlink direction, and wherein*

*the base station acknowledges the mobile station's reservation request on a downlink time slot which corresponds to an uplink time slot wherein the reservation request was transmitted, and in the event that the corresponding downlink time slot is assigned for transmitting information to another mobile station, the corresponding downlink time slot is stolen by the base station for use in transmitting the acknowledgment time slot, and the information is transmitted later to the other mobile station.*

*57. A method for transmitting packet data in the air interface of a digital cellular system based on time division multiple access (TDMA) having uplink and downlink time slots a plurality of which comprise an uplink and a downlink TDMA frame, respectively, comprising the steps of:*

*defining downlink logical channels from a base station to a cell served by the base station, the downlink logical channels being defined to comprise information channels and control channels, the downlink logical channels using the downlink time slots; and*

*defining uplink logical channels from a mobile station to a base station, the uplink logical channels being defined to comprise information channels reserved for information transmission and a reservation request channel (R), on which the mobile station requests the reservation of a connection for transmitting packet data, the uplink logical channels using the uplink time slots;*

*in the uplink and the downlink TDMA frames a number of the uplink logical channels and downlink logical channels are allocated for packet data transmission, each uplink logical channel having a variable number of uplink time slots and each downlink logical channel having a variable number of downlink time slots, the respective number of allocated uplink time slots in an uplink logical channel and downlink time slots in a downlink logical channel being one of an equal number and an unequal number, in dependence upon the demand for packet data transmission in the uplink direction and respectively upon the demand for packet data transmission in the downlink direction, the total number of allocated time slots for said mobile station being either an even number or an odd number;*

*for the case where the transmission is symmetric and is originated by or terminated by the mobile station, only data packets are transmitted in one direction, and only acknowledgements are transmitted in the opposite direction.*

*58. A method according to claim 39, wherein the respective number of assigned uplink time slots and downlink time slots further being dependent upon a total demand for packet data transmission in the cell.*

*59. A method according to claim 53, wherein the respective number of assigned uplink time slots and downlink time slots further being dependent upon a total demand for packet data transmission in the cell.*

*60. A method according to claim 55, wherein the respective number of assigned uplink time slots and downlink time slots further being dependent upon a total demand for packet data transmission in the cell.*

*61. A method according to claim 56, wherein the respective number of assigned uplink time slots and downlink time slots further being dependent upon a total demand for packet data transmission in the cell.*

*62. A method according to claim 57, wherein the respective number of assigned uplink time slots and downlink time slots further being dependent upon a total demand for packet data transmission in the cell.*

*63. A method according to claim 34 wherein the allocation of logical channels in the uplink and downlink directions comprises reserving a logical channel only in one direction at a time.*

*64. A method according to claim 36 wherein the allocation of logical channels in the uplink and downlink directions comprises reserving a logical channel only in one direction at a time.*

*65. A method according to claim 38 wherein the allocation of logical channels in the uplink and downlink directions comprises reserving a logical channel only in one direction at a time.*

*66. A method according to claim 53 wherein the allocation of logical channels in the uplink and downlink directions comprises reserving a logical channel only in one direction at a time.*

*67. A method according to claim 55 wherein the allocation of logical channels in the uplink and downlink directions comprises reserving a logical channel only in one direction at a time.*

*68. A method according to claim 57 wherein the allocation of logical channels in the uplink and downlink directions comprises reserving a logical channel only in one direction at a time.*

*69. The method of claim 34, wherein at some times the number of allocated time slots for said mobile station is an odd number of time slots.*

*70. A method according to claim 20, wherein the respective number of time slots is also dependent upon a total demand for packet data transmission in the cell.*

*71. A method according to claim 34, wherein the respective number of time slots is also dependent upon a total demand for packet data transmission in the cell.*

*72. A method according to claim 36, wherein the respective number of time slots is also dependent upon a total demand for packet data transmission in the cell.*

*73. A method according to claim 37, wherein the respective number of time slots is also dependent upon a total demand for packet data transmission in the cell.*

*74. A method according to claim 38, wherein the respective number of time slots is also dependent upon a total demand for packet data transmission in the cell.*

* * * * *